US010946969B2

United States Patent
Ng et al.

(10) Patent No.: US 10,946,969 B2
(45) Date of Patent: Mar. 16, 2021

(54) SPLIT VENTILATION SYSTEMS

(71) Applicant: The Boeing Company, Chicago, IL (US)

(72) Inventors: Casey Y. K. Ng, Sammamish, WA (US); Gregg G. LaVoy, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 1270 days.

(21) Appl. No.: 14/457,178

(22) Filed: Aug. 12, 2014

(65) Prior Publication Data

US 2016/0046380 A1 Feb. 18, 2016

(51) Int. Cl.
- *B64D 13/02* (2006.01)
- *B64D 13/00* (2006.01)
- *B64D 11/02* (2006.01)
- *B64D 11/04* (2006.01)
- *B64D 13/04* (2006.01)

(52) U.S. Cl.
CPC ............. *B64D 13/02* (2013.01); *B64D 13/00* (2013.01); *B64D 11/02* (2013.01); *B64D 11/04* (2013.01); *B64D 2013/003* (2013.01)

(58) Field of Classification Search
CPC ........ B64D 13/02; B64D 13/00; B64D 13/06; B64D 13/04; B60H 1/32; Y02T 50/56
USPC ......................................... 454/76, 70, 71, 74
See application file for complete search history.

(56) References Cited

U.S. PATENT DOCUMENTS

| | | | | |
|---|---|---|---|---|
| 2,391,838 A | * | 12/1945 | Kleinhans et al. .... | B64D 13/08 165/103 |
| 2,407,258 A | * | 9/1946 | Del Mar ................ | B64D 13/04 454/74 |
| 4,262,495 A | * | 4/1981 | Gupta .................... | B64D 13/06 62/172 |

(Continued)

FOREIGN PATENT DOCUMENTS

| | | |
|---|---|---|
| DE | 102007049926 A1 | 4/2009 |
| EP | 0382604 A1 | 8/1990 |

(Continued)

OTHER PUBLICATIONS

Extended European Search Report dated Nov. 11, 2015, European Application No. 15177366, pp. 1-8.

(Continued)

*Primary Examiner* — Edelmira Bosques
*Assistant Examiner* — Christopher Matthew Odell
(74) *Attorney, Agent, or Firm* — MH2 Technology Law Group LLP

(57) ABSTRACT

A ventilation system, aircraft, and method. The ventilation system includes a first conduit in fluid communication with a first air source in the aircraft to direct a fluid flow from the first air source. The ventilation system also includes a first branch in fluid communication with the first conduit and a first outflow point, the first branch including an active air mover to move the fluid flow toward the first outflow point. The ventilation system further includes a second branch that is separate from the first branch and in fluid communication with the first conduit and a second outflow point, the second branch including a passive air mover to move the fluid flow to toward the second outflow point.

20 Claims, 2 Drawing Sheets

(56) References Cited

U.S. PATENT DOCUMENTS

| | | | | |
|---|---|---|---|---|
| 5,169,415 A * | 12/1992 | Roettger | ............... | A62B 7/14 |
| | | | | 128/204.29 |
| 5,253,484 A * | 10/1993 | Corman | ............... | B64D 13/00 |
| | | | | 454/76 |
| 5,328,152 A * | 7/1994 | Castle | ............... | B60H 1/3442 |
| | | | | 251/229 |
| 5,531,220 A * | 7/1996 | Cassidy | ............... | A62B 7/14 |
| | | | | 128/203.25 |
| 5,695,396 A * | 12/1997 | Markwart | ............... | B64D 13/00 |
| | | | | 454/71 |
| 6,306,032 B1 * | 10/2001 | Scheffler | ............... | B64D 13/08 |
| | | | | 244/129.2 |
| 6,401,473 B1 * | 6/2002 | Ng | ............... | B64D 13/06 |
| | | | | 454/71 |
| 6,645,064 B1 * | 11/2003 | Werjefelt | ............... | B64D 45/00 |
| | | | | 244/118.5 |
| 7,837,541 B2 * | 11/2010 | Gray | ............... | B64D 13/04 |
| | | | | 244/118.5 |
| 8,365,550 B2 * | 2/2013 | Vogel | ............... | B64D 13/06 |
| | | | | 454/74 |
| 8,435,103 B2 * | 5/2013 | Centofante | ............... | B64D 13/06 |
| | | | | 454/71 |
| 9,016,075 B1 * | 4/2015 | Johnson | ............... | F25B 9/06 |
| | | | | 62/115 |
| 9,022,843 B2 * | 5/2015 | Dreisilker | ............... | B64D 13/02 |
| | | | | 137/893 |
| 9,234,707 B2 * | 1/2016 | Mackin | ............... | F28F 3/025 |
| 9,376,212 B2 * | 6/2016 | Liebich | ............... | B64D 13/02 |
| 9,481,468 B1 * | 11/2016 | Schiff | ............... | B64D 13/00 |
| 9,669,936 B1 * | 6/2017 | Fiterman | ............... | B64D 13/06 |
| 2001/0042612 A1 * | 11/2001 | Hasenoehrl | ............... | B64D 11/0015 |
| | | | | 165/80.3 |
| 2002/0162345 A1 * | 11/2002 | Laugt | ............... | B64D 13/02 |
| | | | | 62/239 |
| 2004/0231350 A1 * | 11/2004 | Kline | ............... | B64D 13/00 |
| | | | | 62/244 |
| 2005/0188716 A1 * | 9/2005 | Brutscher | ............... | B64D 13/06 |
| | | | | 62/402 |
| 2006/0252360 A1 * | 11/2006 | Mitchneck | ............... | B64D 13/04 |
| | | | | 454/74 |
| 2007/0004326 A1 * | 1/2007 | Haas | ............... | B64D 13/06 |
| | | | | 454/71 |
| 2010/0029190 A1 * | 2/2010 | Dessero | ............... | B64D 13/08 |
| | | | | 454/76 |
| 2010/0210201 A1 * | 8/2010 | Dreisilker | ............... | B64D 13/02 |
| | | | | 454/74 |
| 2010/0240290 A1 | 9/2010 | Markwart et al. | | |
| 2011/0177771 A1 * | 7/2011 | Kelnhofer | ............... | B64D 13/00 |
| | | | | 454/76 |
| 2011/0306285 A1 * | 12/2011 | Heuer | ............... | B64D 13/02 |
| | | | | 454/76 |
| 2013/0084789 A1 * | 4/2013 | Morishita | ............... | B60H 1/32 |
| | | | | 454/70 |
| 2013/0231035 A1 * | 9/2013 | Desmarais | ............... | B64D 13/006 |
| | | | | 454/75 |
| 2014/0102125 A1 * | 4/2014 | Tinde | ............... | B64F 1/362 |
| | | | | 62/237 |
| 2014/0342648 A1 * | 11/2014 | Hart | ............... | B64D 13/06 |
| | | | | 454/76 |
| 2016/0231031 A1 * | 8/2016 | Bruno | ............... | B64D 13/06 |

FOREIGN PATENT DOCUMENTS

| | | | | |
|---|---|---|---|---|
| GB | 1076074 A | * | 7/1967 | ......... F04D 27/0253 |
| WO | 9411244 A1 | | 5/1994 | |
| WO | 2011056285 A1 | | 5/2011 | |
| WO | 2013120764 A1 | | 8/2013 | |

OTHER PUBLICATIONS

Brazilian Office Action and Written Opinion issued in corresponding Brazilian Application No. BR102015018878-1, 6 pages.

* cited by examiner

SPLIT VENTILATION SYSTEMS

BACKGROUND

Generally, an aircraft includes a ventilation system that removes air from the interior thereof, e.g., to remove odors, etc., and to allow for the circulation of fresh and/or temperature-controlled air. The removed air may be routed via the ventilation system to an outflow location, and then discharged overboard into the ambient environment.

In some aircraft, the interior may include multiple galleys and/or multiple lavatories, which may need to be ventilated. The galleys and/or lavatories may be located generally toward opposite ends (e.g., forward and aft ends) of the aircraft. In such aircraft, the ventilation system typically receives the air from these galleys and lavatories and deposits it into a common duct running along the "crown" of the aircraft, i.e., the space between the rounded top of the fuselage and an interior ceiling. This duct line generally runs along a substantial portion of the length of the aircraft and terminates at or near the aft end of the aircraft. The ventilation system includes ductwork that connects this duct line to the discharge location, which may be below the galleys.

Fans are employed at the discharge location to pull the air from the galleys and/or lavatories, through the various ducts, to the discharge location, and ultimately overboard. Generally, at least two fans are provided for purposes of redundancy.

However, crown space, especially on relatively small-body aircraft, is scarce, and the duct line running along the length of the aircraft occupies a substantial amount of the crown space. Furthermore, weight capacity and power are also limited on an aircraft. Accordingly, what is needed are ventilation solutions that minimize crown-space usage, while avoiding increased weight and power consumption.

SUMMARY

The present disclosure provides a ventilation system for an aircraft. The ventilation system includes a first conduit in fluid communication with a first air source in the aircraft, to direct a fluid flow from the first air source, and a first branch in fluid communication with the first conduit and a first outflow point, the first branch including an active air mover to move the fluid flow toward the first outflow point. The ventilation system also includes a second branch that is separate from the first branch and in fluid communication with the first conduit and a second outflow point, the second branch including a passive air mover to move the fluid flow to the second outflow point.

The first and second outflow points may be located proximal to a same end of the aircraft as the first air source.

The active air mover may include a fan.

The passive air mover may include a Venturi port.

The ventilation system may further include at least one detector coupled to the first branch, the second branch, the first conduit, or a combination thereof, the at least one detector being responsive to a pressure, flow-rate, or both.

The second branch may include a shutoff valve having an open position and a closed position. The shutoff valve in the closed position blocks fluid communication from the first conduit to the passive air mover, and the shutoff valve in the open position allows fluid communication from the first conduit to the passive air mover.

The ventilation system may further include a noise dampener in communication with the second branch.

The ventilation system may further include a second conduit in fluid communication with a second air source in the aircraft, to direct a fluid flow from the second air source, and a third branch in fluid communication with the second conduit and a third outflow point, the third branch including a second active air mover to move the fluid flow toward the third outflow point. The ventilation system may also include a fourth branch that is separate from the third branch and in fluid communication with the second conduit and a fourth outflow point, the fourth branch including a second passive air mover to move the fluid flow toward the fourth outflow point.

The second conduit may not directly communicate with the first conduit.

The first and second outflow points may be closer to the first air source than to the second air source, and the third and fourth outflow points may be closer to the second air source than to the first air source.

The present disclosure also provides an aircraft including a fuselage including a first air source, and a first ventilation system. The first ventilation system includes a first conduit fluidly communicating with the first air source, to direct a fluid flow from the first air source. The first ventilation system also includes a first branch in fluid communication with the first conduit and a first outflow point, the first branch including an active air mover to move the fluid flow toward the first outflow point, and a second branch that is separate from the first branch and in fluid communication with the first conduit and a second outflow point, the second branch including a passive air mover to move the fluid flow to the second outflow point.

The fuselage may include a second air source that is aft of the first air source, and the first conduit of the first ventilation system may not be in direct fluid communication with the second air source.

The aircraft also includes a second ventilation system. The second ventilation system includes a second conduit in fluid communication with the second air source and not in direct fluid communication with the first air source, and a third branch in fluid communication with the second conduit and a third outflow point, the third branch including a second active air mover. The second ventilation system also includes a fourth branch that is separate from the third branch and in fluid communication with the second conduit and a fourth outflow point, the fourth branch including a second passive air mover.

The second ventilation system may be aft of the first ventilation system.

The third and fourth outflow points may be closer to the second air source than to the first air source, and the first and second outflow points may be closer to the first air source than to the second air source.

The present disclosure further provides a method for venting air from an aircraft. The method includes powering an active air mover of a first branch of a ventilation system to move air from a first air source of the aircraft through a conduit, and to a first outflow point of the aircraft. The method also includes opening a shutoff valve in a second branch of the ventilation system, to move air from the conduit to a second outflow point of the aircraft using a passive air mover.

The passive air mover may include a Venturi port that fluidly communicates with an exterior of the aircraft at the second outflow point, such that opening the shutoff valve reduces a pressure in the conduit.

The method may further include determining that an airflow rate through the first branch is below a threshold.

Opening the shutoff valve is in response to determining the airflow through the first branch is below the threshold.

The method may further include determining that a pressure in the second branch is below a threshold. Opening the shutoff valve is in response to determining that the pressure in the second branch is below the threshold.

The method may further include powering a second air mover of a third branch of a second ventilation system to move air from a second air source of the aircraft through a second conduit, and to a third outflow point of the aircraft, and opening a second shutoff valve in a fourth branch of the second ventilation system, to move air from the second conduit to a fourth outflow point of the aircraft using a second passive air mover.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the figure have been simplified and are drawn to facilitate understanding of the present teachings, rather than to maintain strict structural accuracy, detail, and scale.

DETAILED DESCRIPTION

Figure 1:
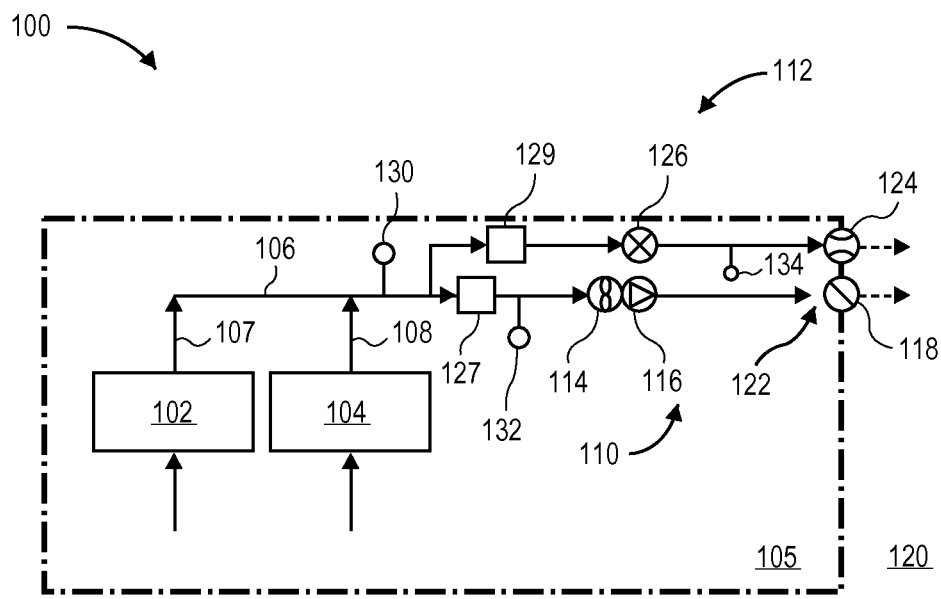
FIG. 1 illustrates a schematic view of an example of a split ventilation system.

FIG. 1 illustrates a schematic view of an example of a ventilation system 100, according to the present disclosure. The ventilation system 100 may be employed in an aircraft and is described herein with reference thereto. However, it will be appreciated that the ventilation system 100 may also or instead be employed in other vehicles, such as surface marine vessels, land vehicles, etc.

The ventilation system 100 may be in fluid communication with at least one air source, for example, two air sources 102, 104 located in an interior 105 of the aircraft. Specifically, the air sources 102, 104 may be or include one or more galleys and/or one or more lavatories, or any other volumes of air in an aircraft. The ventilation system 100 may be in fluid communication with the air sources 102, 104 via a conduit 106. The conduit 106 may be divided, as shown, into lines 107, 108, which may be coupled with the air sources 102, 104, respectively. Further, the lines 107, 108 may be joined, as part of the conduit 106, as shown, or may be maintained as parallel lines. Although two sources 102, 104 and two lines 107, 108 are shown, it will be appreciated that any number of sources may be present, which may each have a line coupled with the conduit 106 associated therewith, or two or more such sources may be coupled with a single line.

The ventilation system 100 may also include a first branch 110 and a second branch 112, which may be separate and in fluid communication with the conduit 106. In particular, the first branch 110 may include an active air mover 114. The active air mover 114 may be a fan, which may be "active" in that it is powered and is operable to move the air at the selection of a user.

The active air mover 114 may be in fluid communication with the conduit 106. The fluid communication between the active air mover 114 and the conduit 106 may be provided as a single connection or, as mentioned above, the lines 107, 108 may be run in parallel and thus the active air mover 114 may be in fluid communication with the lines 107, 108 via separate connections. Moreover, the active air mover 114 may be representative of two or more fans.

The first branch 110 may also include a check valve 116 to prevent negative pressure from causing air to flow backwards from the first branch 110 into the conduit 106 and/or into the air sources 102, 104. Further, the first branch 110 may be in fluid communication with a first outflow point, which may be provided by an outflow valve 118. The outflow valve 118 may provide a controlled interface between the interior 105 of the aircraft and an exterior 120 thereof, e.g., ambient environment. In particular, the outflow valve 118 may prevent depressurization of the interior 105 and/or backflow of air from the exterior 120 to the interior 105. The first branch 110 may be coupled directly to the outflow valve 118 or, as shown, an air gap 122 may be interposed therebetween. When powered, the active air mover 114 may be operable to draw air from the air sources 102, 104, through the conduit 106, and to the outflow valve 118.

Turning now to the second branch 112, the second branch 112 may include a passive air mover 124, which may be situated at or otherwise communicate with a second outflow point that is different from the first outflow point. The passive air mover 124 may be characterized as "passive" in that it may not be powered and may employ the physical conditions, such as a pressure differential, to move air. Further, whether such a physical condition (e.g., pressure differential) is present may not be directly selectable by a user. One example of such a passive air mover 124 is a Venturi port, which may also be referred to as a Venturi tube, a Venturi, or an ejector. Venturi ports generally operate by creating a low-pressure stream of fluid, which pumps a higher-pressure (often generally quiescent) fluid by drawing the higher-pressure fluid into the low-pressure stream. In the case of an aircraft, the low-pressure stream may be readily available when the aircraft moves through the air, e.g., at altitude.

Accordingly, at least when the aircraft is moving and/or at altitude, the passive air mover 124 may be operable to lower the pressure in the second branch 112, thereby moving air from the air sources 102, 104 via conduit 106 to the second outflow point (which may be the passive air mover 124, or a point downstream thereof). However, when the low-pressure stream is not available, for example, when the aircraft is stationary and/or the ground, the passive air mover 124 may not be operable to move air from the air sources 102, 104.

Thus, the second branch 112 may include a shutoff valve 126. The shutoff valve 126 may have two or more positions. The positions may include a closed position in which the shutoff valve 126 substantially prevents fluid communication between the passive air mover 124 and the conduit 106, and an open position in which the shutoff valve 126 allows fluid communication between the passive air mover 124 and the conduit 106. Like the active air mover 114, the passive air mover 124 may be coupled with the conduit 106 at a single connection or using multiple connections, such as when the lines 107, 108 are maintained as separate, parallel lines.

The first branch 110 may include a noise dampener 127, and/or second branch 112 may also include a noise dampener 129. The noise dampeners 127, 129 may attenuate noise associated with the active air mover 114 and the passive air mover 124, respectively, in addition to noise associated with other components of the respective first and second branches 110, 112. Various types of noise dampeners 127, 129 may be employed, such as Helmholtz resonators, noise dampening materials, etc.

The first and second outflow points may be located generally proximal to the air sources 102, 104. For example, the outflow points may be located on a same end (e.g., aft or forward) of an aircraft fuselage as the air sources 102, 104. Thus, the distance between the outflow points and the air sources 102, 104 may be minimized, thereby minimizing the length of the conduit 106.

The active air mover 114 may be capable of ventilating the aircraft, regardless of whether the aircraft is moving or at altitude. As such, the first branch 110, including the active air mover 114, may generally be employed, e.g., with the active air mover 114 energized. The second branch 112, including the passive air mover 124 may generally be inactive, e.g., with the shutoff valve 126 closed.

The shutoff valve 126 may be opened in response to one or more conditions. For example, the ventilation system 100 may include one or more detectors (three are shown: 130, 132, 134). The detectors 130, 132, 134 may be located in one or more of the conduit 106, the first branch 110, and the second branch 112. Further, the detectors 130, 132, 134 may be or include one or more flow meters, pressure sensors, or the like, which may provide signals responsive to a pressure and/or flow rate in the ventilation system 100.

The ventilation system 100 may open or close the shutoff valve 126 in response to the readings provided by the detectors 130, 132, 134. For example, thresholds may be determined that may be associated with desired or nominal flow rates and/or pressures through the ventilation system 100. When the active air mover 114 is energized and the shutoff valve 126 is closed, a flow rate reading in the conduit 106 and/or the first branch 110 below a threshold flow rate may indicate that the active air mover 114 has failed or is otherwise not providing sufficient ventilation. In response, the ventilation system 100 (or an operator thereof) may determine whether to open the shutoff valve 126 to engage the passive air mover 124.

This second determination may be made at least partially based on the air pressure (e.g., in psi) in the second branch 112 downstream from the shutoff valve 126, e.g., as measured by the detector 134. If this pressure is below a threshold, it may indicate that the passive air mover 124 is operational, and the shutoff valve 126 may be opened. Moreover, it will be appreciated that the latter determination, as to whether to open the shutoff valve 126 may, in some cases, be made irrespective of the flow rate or pressure in the first branch 110, e.g., to conserve power by supplementing or replacing the ventilation provided by the active air mover 114, when the passive air mover 124 is operational.

Figure 2:
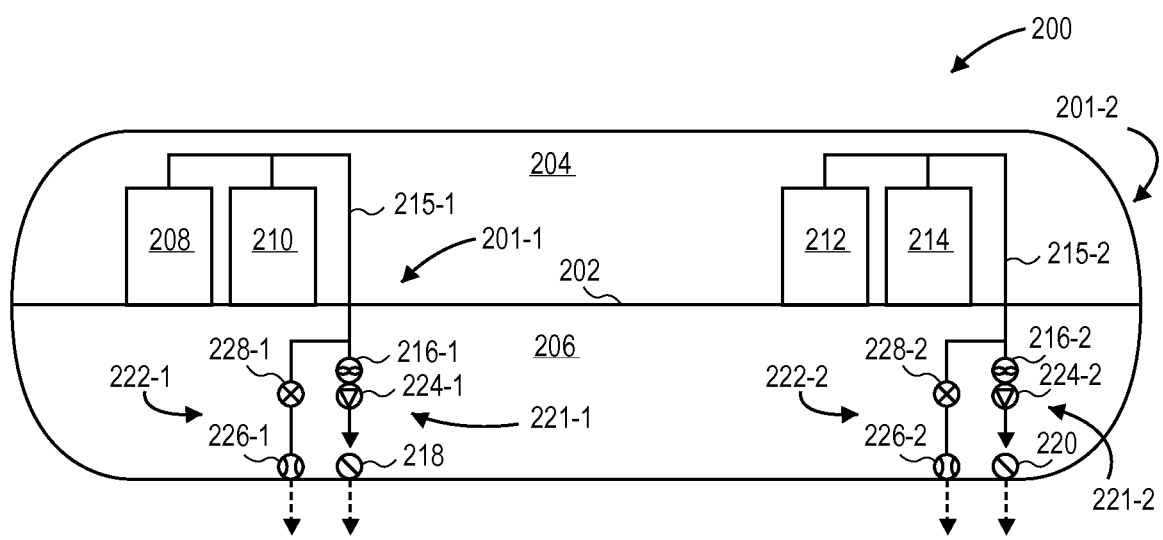
FIG. 2 illustrates a schematic view of an example of a split ventilation system employed in an aircraft.

FIG. 2 illustrates a schematic view of an aircraft 200, which may employ two ventilation systems 100, e.g., one forward ventilation system 201-1 and one aft ventilation system 201-2. As shown, the aircraft 200 may include a fuselage floor 202, which may serve to divide the aircraft 200 vertically into an upper portion 204 and a lower portion 206. A forward galley 208 and a forward lavatory 210 may be the forward air sources for the forward ventilation system 201-1, and an aft galley 212 and an aft lavatory 214 may be the aft air sources for the aft ventilation system 201-2.

The forward ventilation system 201-1 may include a conduit 215-1, which may be coupled with or otherwise fluidly communicate with the forward galley 208 and the forward lavatory 210, as shown, but may not be coupled with the aft galley 212 or the aft lavatory 214. Moreover, the conduit 215-1 may not be in direct fluid communication with the aft galley 212 or the aft lavatory 214; however, communication between the conduit 215-1 and the aft air sources 212, 214 may generally include communication via an intermediate volume of air, such as in a situation where the forward and aft galleys 208, 212 are connected via a corridor.

Similarly, the aft ventilation system 201-2 may include a conduit 215-2, which may be coupled with or otherwise fluidly communicate with the aft galley 212 and the aft lavatory 214, as shown, but may not be coupled with the forward galley 208 or the forward lavatory 210. Moreover, the conduit 215-2 may not be in direct fluid communication with the forward galley 208 or the forward lavatory 210; rather, communication between the conduit 215-2 and the forward air sources 208, 210 may generally include communication via an intermediate volume of air, such as if the forward and aft galleys 208, 212 are connected via a corridor.

The conduits 215-1, 215-2 may each extend generally proximal to the forward air sources 208, 210 and the aft air sources 212, 214, respectively, from the upper portion 204, through the fuselage floor 202, and to the lower portion 206. In the lower portion 206, the forward and aft ventilation systems 201-1 and 201-2 may each include an active air mover 216-1, 216-2, respectively. The active air movers 216-1, 216-2 may have initially been provided for redundancy in a single ventilation system, and thus the forward and aft ventilation systems 201-1 and 201-2 may be retrofitted to the aircraft 200 using the pre-existing active air movers 216-1, 216-2. Similarly, the forward and aft ventilation systems 201-1 and 201-2 may be in fluid communication with forward and aft outflow valves 218, 220, which may also have been provided for redundancy in a single ventilation system in a pre-existing aircraft, further facilitating retrofitting.

The forward and aft ventilation systems 201-1 and 201-2 may each include a first branch 221-1, 221-2 and a second branch 222-1, 222-2, respectively. The first branches 221-1, 221-2 may include the active air movers 216-1, 216-2, respectively, as well as a check valve 224-1, 224-2, respectively. The second branches 222-1, 222-2 may each include a passive air mover 226-1, 226-2, respectively, which may be coupled with the respective galleys 208, 212 and lavatories 210, 214 via a shutoff valve 228-1, 228-2, respectively.

During operation of the ventilation systems 201-1 and 201-2, the active air movers 216-1, 216-2 may be energized (e.g., powered, activated, etc.) and may draw air from the respective galleys 208, 212 and lavatories 210, 214, and push the air toward the respective outflow valves 218, 220. The outflow valves 218, 220 may thus provide two separate outflow points for the first branches 221-1, 221-2 of the ventilation systems 201-1, 201-2. If one or both of the active air movers 216-1, 216-2 fails or otherwise becomes insufficient to vent the galleys 208, 212 and/or lavatories 210, 214, one or both of the shutoff valves 228-1, 228-2, may be opened in response, such that air may be vented using one or both of the passive air movers 226-1, 226-2. Thus, the passive air movers 226-1, 226-2 may provide two additional, separate outflow points for the ventilation systems 201-1, 201-2.

The outflow points for the two ventilation systems 201-1, 201-2 may be selected such that they are proximal to the air sources 208, 210, 212, 214 coupled with the systems 201-1, 201-2. For example, the forward outflow valve 218 and the passive air mover 226-1, providing two outflow points for the forward ventilation system 201-1, may be positioned closer to the forward air sources 208, 210 than to the aft air sources 212, 214. Similarly, the aft outflow valve 220 and the passive air mover 226-2, providing two outflow points for the aft ventilation system 201-2, may be positioned closer to the aft air sources 212, 214 than to the forward air sources 208, 210. In general, as an example, the outflow points for a ventilation system may be positioned on the same side (e.g., forward or aft) as the air sources from which the ventilation system draws air.

Figure 3:
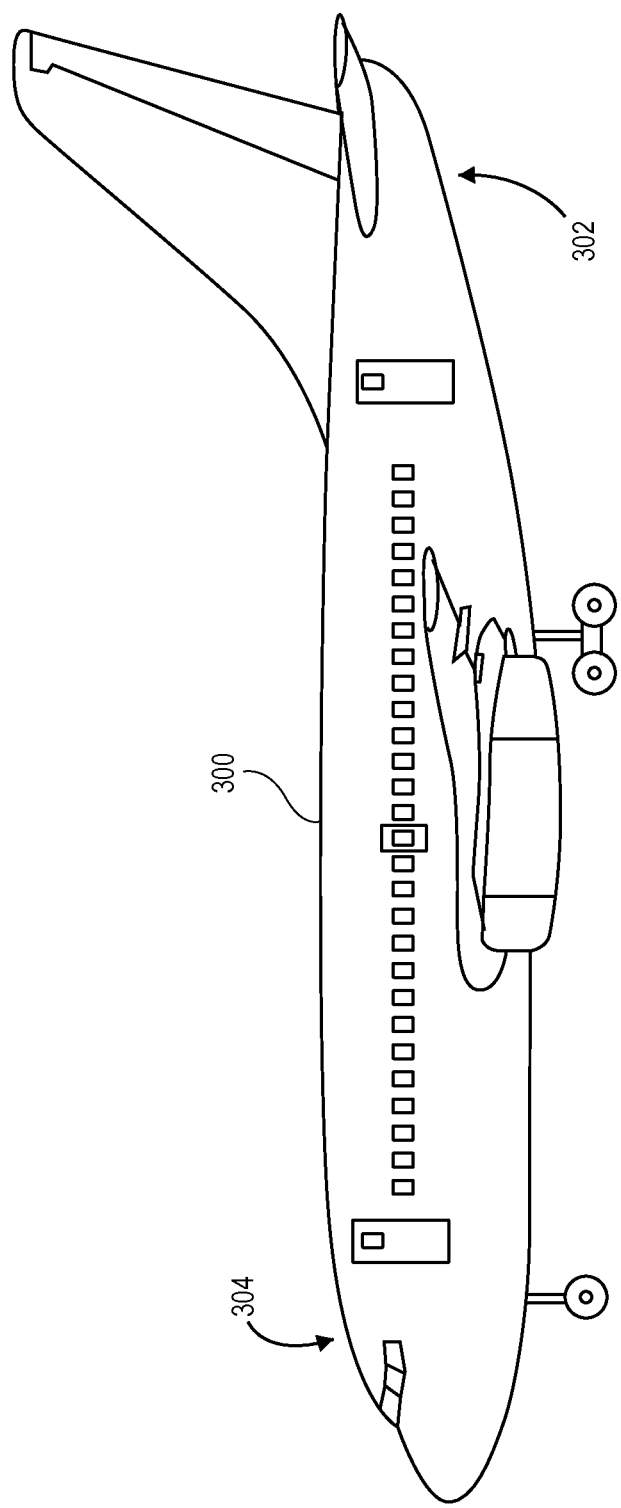
FIG. 3 illustrates an exterior side view of an example of an aircraft that employs the split ventilation system.

FIG. 3 illustrates a side view of an exterior of an aircraft 300. The aircraft 300 may employ one or more embodiments of the ventilation system 100 discussed and described above. Moreover, the aircraft 300 may have an aft end 302 and a forward end 304.

Accordingly, it will be appreciated that a split-ventilation system may be provided for an aircraft. The split ventilation system may be retrofitted to existing aircraft, employing equipment configured for redundancy in unitary vent systems, such as fans and outflow valves, so as to position the ventilation system components in proximity to the air sources and minimize space consumed by ductwork. Further, a passive air mover may be employed to provide redundancy in the split ventilation system, while minimizing additional weight and power consumption.

To the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the present teachings.

The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The features, functions, and advantages that have been discussed can be achieved independently in various embodiments or may be combined in yet other embodiments further details of which can be seen with reference to the following description and drawings.

What is claimed is:

1. A ventilation system for an aircraft, the ventilation system comprising:
    a first conduit, in fluid communication with a first air source in the aircraft, configured to direct a first fluid flow away from the first air source;
    a first branch in fluid communication with the first conduit and a first outflow point at a first interface between an interior and an exterior of the aircraft, the first branch comprising a first active air mover within the first branch configured to move the first fluid flow toward the first outflow point, wherein the first branch does not include a passive air mover within the first branch;
    a second branch that is separate from the first branch and in fluid communication with the first conduit and a second outflow point at a second interface between the interior and the exterior of the aircraft, the second branch comprising a first passive air mover within the second branch configured to move the first fluid flow to the second outflow point, wherein the second branch does not include an active air mover within the second branch; and
    at least one detector located in the first conduit, the first branch, the second branch, or a combination thereof;
    wherein the at least one detector is responsive to pressure, flow rate, or both.

2. The ventilation system of claim 1, wherein the first and second outflow points are located proximal to a same end of the aircraft as the first air source.

3. The ventilation system of claim 1, wherein the first active air mover comprises a fan.

4. The ventilation system of claim 1, wherein the first passive air mover comprises a Venturi port.

5. The ventilation system of claim 1, wherein the second branch comprises a shutoff valve having an open position and a closed position,
    wherein the shutoff valve in the closed position is configured to block the fluid communication from the first conduit to the first passive air mover, and
    wherein the shutoff valve in the open position is configured to allow the fluid communication from the first conduit to the first passive air mover.

6. The ventilation system of claim 1, further comprising:
    a noise dampener in communication with the second branch.

7. The ventilation system of claim 1, further comprising:
    a second conduit, in fluid communication with a second air source in the aircraft, configured to direct a second fluid flow away from the second air source;
    a third branch in fluid communication with the second conduit and a third outflow point at a third interface between the interior and the exterior of the aircraft, the third branch comprising a second active air mover configured to move the second fluid flow toward the third outflow point; and
    a fourth branch that is separate from the third branch and in fluid communication with the second conduit and a fourth outflow point at a fourth interface between the interior and the exterior of the aircraft, the fourth branch comprising a second passive air mover configured to move the second fluid flow toward the fourth outflow point.

8. The ventilation system of claim 7, wherein the second conduit does not directly communicate with the first conduit.

9. The ventilation system of claim 7, wherein the first and second outflow points are closer to the first air source than to the second air source, and
wherein the third and fourth outflow points are closer to the second air source than to the first air source.

10. An aircraft, comprising:
a fuselage comprising a first air source; and
a first ventilation system comprising:
a first conduit, in fluid communication with the first air source, configured to direct a first fluid flow away from the first air source;
a first branch in fluid communication with the first conduit and a first outflow point at a first interface between an interior and an exterior of the aircraft, the first branch comprising a first active air mover configured to move the first fluid flow toward the first outflow point, wherein the first branch does not include a passive air mover within the first branch;
a second branch that is separate from the first branch and in fluid communication with the first conduit and a second outflow point at a second interface between the interior and the exterior of the aircraft, the second branch comprising a first passive air mover configured to move the first fluid flow to the second outflow point, wherein the second branch does not include an active air mover within the second branch; and
at least one detector located in the first conduit, the first branch, the second branch, or a combination thereof;
wherein the at least one detector is responsive to pressure, flow rate, or both.

11. The aircraft of claim 10, wherein the fuselage comprises a second air source that is aft of the first air source, and
wherein the first conduit of the first ventilation system is not in direct fluid communication with the second air source.

12. The aircraft of claim 11, further comprising:
a second ventilation system comprising:
a second conduit in fluid communication with the second air source and not in direct fluid communication with the first air source;
a third branch in fluid communication with the second conduit and a third outflow point at a third interface between the interior and the exterior of the aircraft, the third branch comprising a second active air mover; and
a fourth branch that is separate from the third branch and in fluid communication with the second conduit and a fourth outflow point at a fourth interface between the interior and the exterior of the aircraft, the fourth branch comprising a second passive air mover.

13. The aircraft of claim 12, wherein the second ventilation system is aft of the first ventilation system.

14. The aircraft of claim 12, wherein the third and fourth outflow points are closer to the second air source than to the first air source, and
wherein the first and second outflow points are closer to the first air source than to the second air source.

15. A method for venting air from an aircraft, the method comprising:
powering a first active air mover within a first branch of a first ventilation system to move air from a first air source of the aircraft through a first conduit, and to a first outflow point at a first interface between an interior and an exterior of the aircraft, wherein the first branch does not include a passive air mover within the first branch;
opening a first shutoff valve, within a second branch of the first ventilation system, to move air from the first conduit to a second outflow point at a second interface between the interior and the exterior of the aircraft using a first passive air mover within the second branch, wherein the second branch does not include an active air mover within the second branch; and
determining that an airflow rate through the first conduit is below a threshold;
wherein the opening of the first shutoff valve is in response to determining that the airflow rate through the first conduit is below the threshold.

16. The method of claim 15, wherein the first passive air mover is a Venturi port that fluidly communicates with the exterior of the aircraft at the second outflow point, such that the opening of the first shutoff valve reduces pressure in the second branch.

17. The method of claim 15, further comprising:
powering a second active air mover of a third branch of a second ventilation system to move air from a second air source of the aircraft through a second conduit, and to a third outflow point at a third interface between the interior and the exterior of the aircraft; and
opening a second shutoff valve in a fourth branch of the second ventilation system, to move air from the second conduit to a fourth outflow point at a fourth interface between the interior and the exterior of the aircraft using a second passive air mover.

18. A method for venting air from an aircraft, the method comprising:
powering a first active air mover within a first branch of a first ventilation system to move air from a first air source of the aircraft through a first conduit, and to a first outflow point at a first interface between an interior and an exterior of the aircraft, wherein the first branch does not include a passive air mover within the first branch;
opening a first shutoff valve, within a second branch of the first ventilation system, to move air from the first conduit to a second outflow point at a second interface between the interior and the exterior of the aircraft using a first passive air mover within the second branch, wherein the second branch does not include an active air mover within the second branch; and
determining that a pressure in the second branch is below a threshold;
wherein the opening of the first shutoff valve is in response to determining that the pressure in the second branch is below the threshold.

19. The method of claim 18, wherein the first passive air mover is a Venturi port that fluidly communicates with the exterior of the aircraft at the second outflow point, such that the opening of the first shutoff valve reduces the pressure in the second branch.

20. The method of claim 18, further comprising:
powering a second active air mover of a third branch of a second ventilation system to move air from a second air source of the aircraft through a second conduit, and to a third outflow point at a third interface between the interior and the exterior of the aircraft; and
opening a second shutoff valve in a fourth branch of the second ventilation system, to move air from the second conduit to a fourth outflow point at a fourth interface between the interior and the exterior of the aircraft using a second passive air mover.

\* \* \* \* \*